UNITED STATES PATENT OFFICE.

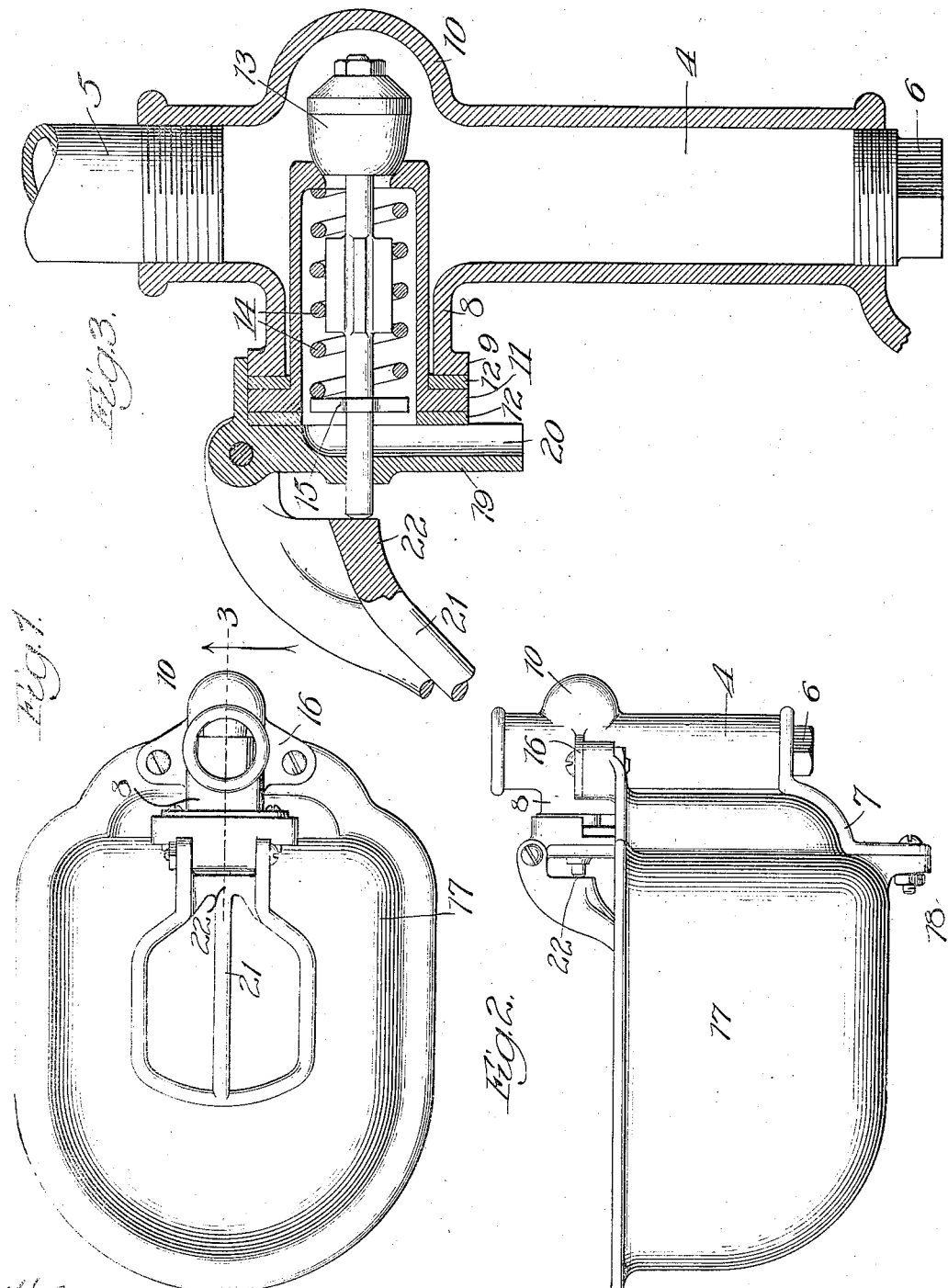

HENRY L. FERRIS, OF HARVARD, ILLINOIS, ASSIGNOR TO HUNT, HELM, FERRIS & COMPANY, OF HARVARD, ILLINOIS, A CORPORATION OF ILLINOIS.

CATTLE-WATERING DEVICE.

1,162,286.  Specification of Letters Patent.  Patented Nov. 30, 1915.

Application filed July 28, 1915. Serial No. 42,351.

*To all whom it may concern:*

Be it known that I, HENRY L. FERRIS, a citizen of the United States, residing at Harvard, in the county of McHenry and State of Illinois, have invented a new and useful Improvement in Cattle-Watering Devices, of which the following is a specification.

My invention relates to certain new and useful improvements in cattle watering devices, and is fully described and explained in the specification and shown in the accompanying drawings, in which:—

Figure 1 is a top plan of my improved device; Fig. 2 is a side elevation and Fig. 3 is a vertical section on the line 3 of Fig. 1.

Referring to the drawings, 4 is a pipe threaded at both ends to receive the water-supply pipes at either end. In the particular illustration here shown the water-supply pipe is indicated by 5 and is attached to the top of the pipe 4, the opposite end being closed by a plug 6 but this arrangement may be reversed when convenient. The pipe 4 is supplied with an integral bracket 7 at its lower end and near its upper end with a laterally projecting boss 8 flanged at 9 and with a protuberance 10 in line with the boss 8. 11 is a thimble which enters the boss, the same being provided with a flange at its forward end, packing gaskets 12 being provided on the two sides of the flange. The rear end of the thimble is closed by a valve 13 normally held shut by a spring 14 bearing on a transverse part 15 on the valve-stem. It is obvious that pushing backward on the valve-stem will open the valve and admit water from the pipe 4 into the thimble, the forward end of which is open for the passage of the water.

The pipe is provided with ears 16 to which is secured a water-bowl 17 which is also provided at its lower end with a lug 18 attached to the ear 7.

To the front of the boss is secured a cap 19 which overlies the front of the thimble and between which and the boss the thimble and its packing gaskets are gripped. The cap opens downwardly at 20 so that the water flowing from the nipple is downwardly deflected by the cap and enters the bowl in a downward direction along its side. The cap also serves as a pivotal support for a valve-operating device 21 which slants down into the bowl in position to be engaged and pushed back by the animal drinking from the bowl. The downward movement of the valve-operating device brings a lug 22 into contact with the projecting end of the valve-stem so as to open the valve.

The present device is advantageous for several reasons. The structure is exceedingly simple and it can be assembled without difficulty. From an operative point of view, the presence of the cap 19 which serves as a deflecting plate for the water is the most important single feature. A device substantially similar to the present one but for that part is found to possess the disadvantage that when the valve is open a stream of water frequently under a rather heavy pressure issues straight out from the end of the nipple and strikes the animal which is attempting to drink. This has a tendency to frighten the animal and in many cases it has been found exceedingly difficult to train animals to drink from the bowl at all. The present arrangement entirely removes this difficulty and it is found that no trouble is experienced in accustoming the animals to the use of the device. The particular method of assembling the present structure is also novel and of some advantage.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

I claim as new and desire to secure by Letters Patent:

In combination a vertically extending water-pipe provided with a laterally projecting boss having a flanged outer end, a nipple within the boss, a valve in the nipple with its stem projecting therefrom, a bowl carried by the pipe, a pivoted valve-operating member in the bowl to engage the valve stem, and a cap over the nipple through which the valve stem extends and between which cap and the boss the flange of the nipple is gripped, whereby the water discharged from the nipple is deflected downward by the cap into the bowl and along the side thereof.

In testimony whereof I have hereunto set my hand this 23d day of July, A. D. 1915.

HENRY L. FERRIS.

In presence of—
L. L. HAMILTON,
WM. A. MUELLER.